United States Patent
Ma et al.

(10) Patent No.: US 9,965,126 B2
(45) Date of Patent: May 8, 2018

(54) PANEL, METHOD FOR PRODUCING THE SAME AND DISPLAY APPARATUS

(71) Applicants: BOE Technology Group Co., Ltd., Beijing (CN); Hefei Xinsheng Optoelectronics Technology Co., Ltd., Anhui (CN)

(72) Inventors: Tao Ma, Beijing (CN); Yinhu Huang, Beijing (CN); Jilei Gao, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 6 days.

(21) Appl. No.: 15/206,425

(22) Filed: Jul. 11, 2016

(65) Prior Publication Data
US 2017/0192585 A1 Jul. 6, 2017

(30) Foreign Application Priority Data
Jan. 4, 2016 (CN) .......................... 2016 1 0003929

(51) Int. Cl.
G06F 3/041 (2006.01)
G06F 3/044 (2006.01)

(52) U.S. Cl.
CPC .... *G06F 3/044* (2013.01); *G06F 2203/04103* (2013.01); *G06F 2203/04111* (2013.01)

(58) Field of Classification Search
CPC ........... G06F 3/044; G06F 2203/04103; G06F 2203/04111
USPC ..................... 345/173–179; 178/18.01–18.09
See application file for complete search history.

(56) References Cited

U.S. PATENT DOCUMENTS

| 5,779,802 | A | * | 7/1998 | Borghs | ................ C23C 14/0021 118/50.1 |
| 5,867,151 | A | * | 2/1999 | Nakai | ..................... G06F 3/041 178/18.01 |
| 5,972,527 | A | * | 10/1999 | Kaijou | ................... C01G 11/00 204/192.1 |
| 6,624,861 | B2 | | 9/2003 | Miyakawa et al. | |

(Continued)

FOREIGN PATENT DOCUMENTS

| CN | 102053751 A | 5/2011 |
| CN | 103176678 A | 6/2013 |

(Continued)

OTHER PUBLICATIONS

First Office Action, for Chinese Patent Application No. 201610003929.9, dated Jan. 24, 2018, 18 pages.

*Primary Examiner* — Stacy Khoo
(74) *Attorney, Agent, or Firm* — Westman, Champlin & Koehler, P.A.

(57) ABSTRACT

An embodiment of the present application provides a method for producing a panel. The method includes: providing a transparent substrate including an electrode setting area; forming a transparent electrode layer within the electrode setting area, wherein the transparent electrode layer includes a plurality of transparent electrodes, and each of the transparent electrodes includes a transparent metal oxide layer and a reduced metal layer on the transparent metal oxide layer. Embodiments of the present application also provide a panel and a display apparatus.

18 Claims, 2 Drawing Sheets

(56) References Cited

U.S. PATENT DOCUMENTS

| | | | |
|---|---|---|---|
| 8,599,150 B2 | 12/2013 | Phillip | |
| 8,599,161 B2 | 12/2013 | Phillip | |
| 9,551,904 B2 | 1/2017 | Phillip | |
| 9,735,195 B2 | 8/2017 | Shu et al. | |
| 2002/0008813 A1* | 1/2002 | Miyakawa | G02F 1/133516 349/106 |
| 2011/0102361 A1* | 5/2011 | Philipp | G06F 3/044 345/174 |
| 2012/0081324 A1 | 4/2012 | Phillip | |
| 2012/0127387 A1* | 5/2012 | Yamato | G06F 3/044 349/42 |
| 2012/0162116 A1 | 6/2012 | Phillip | |
| 2013/0100054 A1 | 4/2013 | Phillip | |
| 2013/0157022 A1* | 6/2013 | Kim | C03C 17/22 428/212 |
| 2014/0251674 A1* | 9/2014 | Gao | H01R 12/79 174/261 |
| 2014/0293154 A1 | 10/2014 | Phillip | |
| 2016/0380022 A1 | 12/2016 | Shu et al. | |

FOREIGN PATENT DOCUMENTS

| | | |
|---|---|---|
| CN | 104637970 A | 5/2015 |
| EP | 1154305 A1 | 11/2001 |

* cited by examiner

PANEL, METHOD FOR PRODUCING THE SAME AND DISPLAY APPARATUS

CROSS-REFERENCE TO RELATED APPLICATION

This application claims the benefit of Chinese Patent Application No. 201610003929.9, entitled as "PANEL, METHOD FOR PRODUCING THE SAME AND DISPLAY APPARATUS", filed on Jan. 4, 2016, incorporated herein by reference in their entirety.

BACKGROUND OF THE INVENTION

Field of the Invention

The present application relates to the technical field of display, and particularly, to a panel, a method for producing the same and a display apparatus including the panel.

Description of the Related Art

A touch screen is gradually replacing a mouse and a keyboard, as a newly developed human-computer interaction equipment, and becomes one of the most simple and convenient input devices currently. Upon producing the touch screen, a designer can work out various different user interfaces by software, and a user does not need any professional operating knowledge. The desired operation can be finished once corresponding positions on the display screen are touched lightly with reference to the function icons.

One Glass Solution (OGS) is meant to a technique of directly forming an ITO conductive film onto a protection glass, so that one glass can function as both a protection glass and a touch sensor, i.e., having double functions. In this way, it can better satisfy needs for ultra-thinning intelligent terminals and improve the display effect. The touch screen product with the OGS structure or arrangement has a series of advantages, such as small thickness, reduced producing procedures, low producing cost, good performance of the product and high production yield.

However, the method in the prior art for improving a glare phenomenon by means of producing an anti-glare film needs to add an additional spin-coating process, thereby causing a relatively high production cost.

SUMMARY

One objective of the present application is to provide a panel, a method for producing the same, and a display apparatus, so that the panel can achieve the anti-glare function without coating the anti-glare film.

In order to solve at least part of the above technical problems, in one aspect of the present application, it provides a method for producing a panel, comprising the following steps of:

providing a transparent substrate comprising an electrode setting area;

forming a transparent electrode layer within the electrode setting area, wherein the transparent electrode layer comprises a plurality of transparent electrodes, and each of the transparent electrodes comprises a transparent metal oxide layer and a reduced metal layer located on the transparent metal oxide layer.

In one example, the step of forming the transparent electrode layer within the electrode setting area comprises:

forming a transparent electrode material layer on the transparent substrate;

reducing the transparent electrode material layer so that materials on a surface of the transparent electrode material layer are reduced;

patterning the reduced transparent electrode material layer, so as to form the transparent electrode layer comprising the plurality of transparent electrodes.

In one example, the step of reducing the transparent electrode material layer comprises:

providing a reducing gas to the surface of the transparent electrode material layer, so that the materials on the surface of the transparent electrode material layer are reduced.

In one example, the reducing gas comprises a hydrogen gas.

In one example, the step of forming the transparent electrode layer within the electrode setting area comprises:

forming the transparent electrode material layer on the transparent substrate;

patterning the transparent electrode material layer, so as to form an initial transparent electrode layer comprising a plurality of initial transparent electrodes;

reducing the initial transparent electrode layer, so that materials on a surface of the initial transparent electrode layer are reduced, thereby obtaining the transparent electrode layer.

In one example, the step of reducing the initial transparent electrode layer comprises:

providing a reducing gas to the surface of the initial transparent electrode layer, so that the materials on the surface of the initial transparent electrode layer are reduced.

In one example, the reducing gas comprises a hydrogen gas.

In one example, the material for producing the transparent metal oxide layer comprises ITO, and the reduced metal layer is transparent and the material for the reduced metal layer comprises indium.

In one example, the panel is a touch panel and the transparent electrode layer is a touch electrode layer.

In one example, the panel is a display panel and the transparent electrode layer is a pixel electrode layer or a common electrode layer.

In one example, the transparent substrate comprises a light shielding zone disposed around the electrode setting area, and the method further comprises:

forming a light shielding pattern within the light shielding zone.

In another aspect of the present application, it provides a panel, comprising:

a transparent substrate comprising an electrode setting area; and a transparent electrode layer provided in the electrode setting area and comprising a plurality of transparent electrodes, wherein each of the transparent electrodes comprises a transparent metal oxide layer and a reduced metal layer located on the transparent metal oxide layer.

In one example, the reduced metal layer is obtained by a metal oxide for forming the transparent metal oxide layer through a reduction reaction, and the reduced metal layer is a layer of metal powder.

In one example, the material for producing the transparent metal oxide layer comprises ITO, and the reduced metal layer is transparent and the material for the reduced metal layer comprises indium.

In one example, the panel is a touch panel and the transparent electrode layer is a touch electrode layer.

In one example, the transparent substrate comprises a light shielding zone disposed around the electrode setting area, and the panel further comprises a light shielding pattern provided within the light shielding zone.

In one example, the panel is a display panel and the transparent electrode layer is a pixel electrode layer or a common electrode layer.

In a further aspect of the present application, it provides a display apparatus, comprising the panel as described above.

In the present application, part of the materials for the transparent electrode is reduced and thus part of metal materials therein is precipitated, so that a gradual change from the transparent state to the semitransparent state is generated. The haze ratio of the transparent electrode layer is increased and glossiness thereof is reduced, so that the diffuse reflection of the transparent electrode layer to the light rays is increased to play the anti-glare role. As compared with the prior art, it is not necessary for the present application to manufacture the anti-glare film, the production process is simplified, and the cost thereof is reduced.

BRIEF DESCRIPTION OF THE DRAWINGS

The drawings are used to help to further understand the present application, and constitute part of the present specification. They are used to interpret the present application in conjunction with the following specific embodiments, but not limiting the present application.

Figure 1:
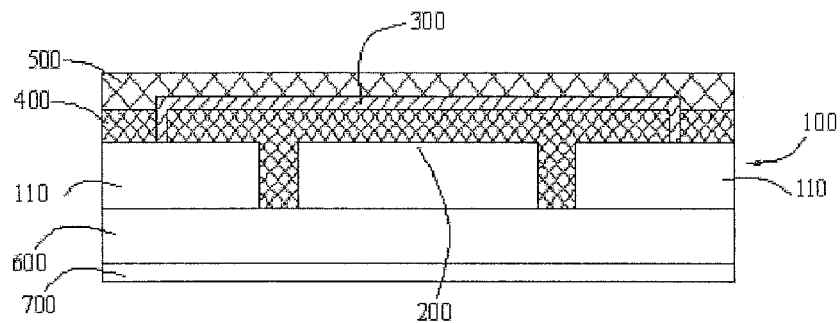
FIG. 1 is a schematic view for showing a cross section of a touch panel in the prior art.

Explanation about reference numerals:

| | |
|---|---|
| 100: first electrode strip | 110: first electrode block |
| 200: second electrode strip | 300: metal bridge |
| 400: first insulation layer | 500: second insulation layer |
| 600: transparent substrate | 700: anti-glare film |
| 110a, 200a: transparent metal oxide layer | |
| 110b, 200b: reduced metal layer | |

DETAILED DESCRIPTION OF THE EMBODIMENTS

Below, specific embodiments of the present application will be explained in detail with reference to the drawings. It should be understood that the specific embodiments described herein are only intended to interpret and explain the present application, rather than limiting the present application.

As shown in FIG. 1, a transparent electrode layer is provided on one surface of a base substrate 600, and an anti-glare film 700 is disposed onto the other surface of the base substrate 600. A plurality of transparent electrodes within the transparent electrode layer include a plurality of first electrode strips 100 and a plurality of second electrode strips 200. The first electrode strip 100 has an extending direction intersecting with that of the second electrode strip 200, but they are insulated from each other. Each of the first electrode strips 100 includes a plurality of first electrode blocks 110. With reference to FIG. 1, the panel further includes a first insulation layer 400 provided on the transparent electrode layer, a metal bridge layer provided on the first insulation layer 400 and a second insulation layer 500 provided on the metal bridge layer. Groups of via holes extending throughout the first insulation layer are provided within the first insulation layer 400. Each group of via holes includes a first via hole corresponding to the preceding first electrode block 110 and a second via hole corresponding to the following first electrode block 110. The metal bridge layer includes a plurality of metal bridges 300, the number of which is identical with that of the groups of via holes. Two ends of the metal bridge 300 electrically connect two adjacent first electrode blocks 110 in the extending direction of the first electrode strip by means of the first via hole and the second via hole.

In an embodiment of the present application, it provides a method for producing the panel, including the steps of:

providing a transparent substrate, including an electrode setting area;

forming a transparent electrode layer within the electrode setting area, wherein the transparent electrode layer includes a plurality of transparent electrodes, and each of the transparent electrodes includes a transparent metal oxide layer and a reduced metal layer located on the transparent metal oxide layer.

The panel provided by the present application is applied in a display apparatus. For example, the panel can be a display panel, or a touch panel. Whether it is the display panel or the touch panel, the transparent electrodes within the transparent electrode layer have very large total surface areas. The reduced metal layer on the transparent metal oxide layer is obtained by reduction precipitation of the transparent metal oxide. Therefore, the reduced metal layer is in fact a layer of metal powders, so that the surface of the reduced metal layer has a relatively high haze ratio. When light rays from the outside illuminate the surface of the transparent electrode layer, diffusion reflection will occur, so that the surface of the panel can have an anti-glare function. Therefore, it can be seen from the above that in the producing method provided by the present application, the anti-glare function can be achieved without the anti-glare layer produced on the panel, thereby reducing the cost of the panel.

In order to not affect a normal display of the display apparatus, the reduced metal layer shall have a sufficiently small thickness so as to enable the reduced metal layer to become transparent.

Figure 2:
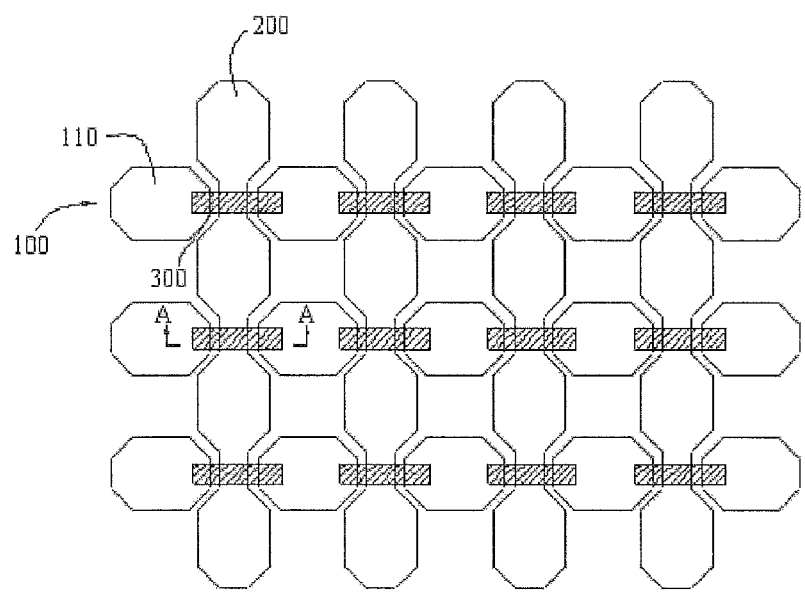
FIG. 2 is a top view of a touch panel provided in accordance with an embodiment of the present application.

When the panel is a display panel, the transparent electrode layer may be a pixel electrode layer, or a common electrode layer. When the panel is a touch panel, the transparent electrode layer is a touch electrode layer. What is shown in FIG. 2 is the case that the panel is the touch panel.

In the embodiment of the present application, the specific steps of forming the transparent electrode including the transparent metal oxide layer and the reduced metal layer are not limited herein. The transparent metal oxide can be patterned firstly and then the patterned transparent metal oxide can be reduced. Alternatively, the transparent metal oxide layer can be reduced firstly, and then be patterned.

Specifically, as one specific implementation of the present application, the step of forming the transparent electrode layer within the electrode setting area of the transparent substrate can include:

forming a transparent electrode material layer on the transparent substrate;

reducing the transparent electrode material layer so that materials on a surface of the transparent electrode material layer are reduced;

patterning the reduced transparent electrode material layer, so as to form the transparent electrode layer including a plurality of transparent electrodes.

In one example, the step of reducing the transparent electrode material layer includes:

providing a reducing gas to the surface of the transparent electrode material layer, so that the materials on the surface of the transparent electrode material layer are reduced.

As another specification implementation of the present application, the step of forming the transparent electrode layer within the electrode setting area of the transparent substrate includes:

forming the transparent electrode material layer on the transparent substrate;

patterning the transparent electrode material layer, so as to form an initial transparent electrode layer including a plurality of initial transparent electrodes;

reducing the initial transparent electrode layer, so that the materials on the surface of the initial transparent electrode layer are reduced, thereby obtaining the transparent electrode layer.

In one example, the step of reducing the initial transparent electrode layer includes:

providing a reducing gas to a surface of the initial transparent electrode layer, so that the materials on the surface of the initial transparent electrode layer are reduced.

In one example of the present application, the reducing gas can include a hydrogen gas.

As one specific implementation of the present application, the material for producing the transparent metal oxide layer includes indium tin oxide (ITO), and accordingly, the reduced metal layer formed on the transparent metal oxide layer includes indium.

As described above, as one specific implementation of the present application, the panel is a touch panel, and the transparent electrode layer is a touch electrode layer.

When the panel is the touch panel, the panel is disposed at a light exiting side of the display panel. Due to divergence of the light, the region on the panel where the light rays are received has an area larger than that of a light exiting surface of the display panel. In order to prevent the light leakage phenomenon occurring at edges of the panel, a light shielding pattern is provided around the panel.

Specifically, the transparent substrate further includes a light shielding zone disposed around the electrode setting area. Therefore, the producing method thereof further includes:

forming a light shielding pattern within the light shielding zone.

In the present application, sequences of forming the light shielding pattern and forming the transparent electrode layer are not specifically limited. For example, the step of forming the light shielding pattern can be performed before the step of forming the transparent electrode layer; and alternatively, the step of forming the light shielding pattern can be performed after the step of forming the transparent electrode layer.

It can be seen from the above description that the light shielding pattern may be in a form of frame. In one example, an outer edge of the light shielding pattern is aligned with the edges of the panel. Specifically, the light shielding pattern has a width (an interval between an outer edge and an inner edge of the light shielding pattern) of 6~8 μm. The width of the light shielding pattern is sufficient to shield the light rays scatted from the display panel, and not to shield the display picture of the display panel.

In one example, the light shielding pattern can be formed by the material for producing a black matrix.

In one specific implementation of the present application, the panel is an OGS touch panel. Specifically, as shown in FIG. 2, the plurality of transparent electrodes in the transparent electrode layer include a plurality of first electrode strips 100 and a plurality of second electrode strips 200. The first electrode strip 100 has an extending direction intersecting with that of the second electrode strip 200 and they are insulated from each other. Each of the first electrode strips 100 includes a plurality of first electrode blocks 110.

Accordingly, the production method thereof further includes after the step of forming the transparent electrode layer:

forming a first insulation layer 400 on the transparent electrode layer;

forming a plurality of groups of via holes extending throughout the first insulation layer 400, wherein each group of via holes corresponds to two adjacent first electrode blocks 110 in the extending direction of the first electrode strip 100, and each group of via holes includes a first via hole corresponding to the preceding first electrode block and a second via hole corresponding to the following first electrode block;

forming a metal bridge layer on the first insulation layer 400, wherein the metal bridge layer includes a plurality of metal bridges 300, the number of which is identical with that of groups of the via holes, and two ends of the metal bridge electrically connect the two adjacent first electrode blocks 110 in the extending direction of the first electrode strip 100 by means of the first via hole and the second via hole;

forming a second insulation layer 500 on the metal bridge layer.

One of the first electrode strip 100 and the second electrode strip 200 is used as a touch drive electrode, and the other of the first electrode strip 100 and the second electrode strip 200 is used as a touch induction electrode.

Figure 3:
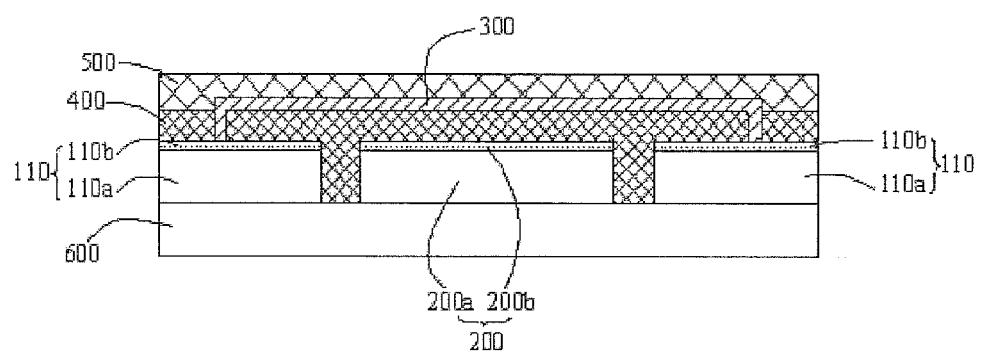
FIG. 3 is a cross section view cut along a line A-A of the FIG. 2.

In the implementation as shown in FIG. 2, the first electrode strips 100 and the second electrode strips 200 almost occupy the entire panel. As shown in FIG. 3, the first electrode block of the first electrode strip includes a transparent metal oxide layer 110a and a reduced metal layer 110b; and the second metal electrode strip 200 includes a transparent metal oxide layer 200a and a reduced metal layer 200b.

In another embodiment of the present application, it provides a panel. The panel includes a transparent substrate and a transparent electrode layer. The transparent substrate includes an electrode setting area, and the transparent electrode layer is provided in the electrode setting area and includes a plurality of transparent electrodes. Each of the transparent electrodes includes a transparent metal oxide layer and a reduced metal layer located on the transparent metal oxide layer. Specifically, the reduced metal layer is obtained by the metal oxide for forming the metal oxide layer through a reduction reaction.

As described above, the reduced metal layer on the transparent metal oxide layer is obtained by reduction precipitation of the transparent metal oxide. Therefore, the reduced metal layer is in fact a layer of metal powders, so that the surface of the reduced metal layer has a relatively high haze ratio. When light rays from the outside illuminate the surface of the transparent electrode layer, diffusion reflection will occur, so that the surface of the panel has an anti-glare function.

In one example of the present application, the material for the transparent metal oxide layer is ITO and the material for the reduced metal layer is indium.

In one example of the present application, the panel is a touch panel and the transparent electrode layer is a touch electrode layer.

In one example of the present application, the panel is a display panel and the transparent electrode layer is a pixel electrode layer or a common electrode layer.

When the panel is the touch panel, the panel is disposed at a light exiting side of the display panel. Due to divergence of the light, the region on the panel where the light rays are received has an area larger than that of a light exiting surface of the display panel. In order to prevent the light leakage phenomenon occurring at edges of the panel, a light shielding pattern is provided around the panel. Specifically, the transparent substrate further includes a light shielding zone disposed around the electrode setting area, and thus the panel further includes a light shielding pattern within the light shielding zone.

It can be seen from the above description that the light shielding pattern may be in a form of frame. In one example, an outer edge of the light shielding pattern is aligned with the edges of the panel. Specifically, the light shielding pattern has a width (an interval between an outer edge and an inner edge of the light shielding pattern) of 6~8 μm. The width of the light shielding pattern is sufficient to shield the light rays scatted from the display panel, and not to shield the display picture of the display panel.

In one example, the light shielding pattern can be formed by the material for producing a black matrix.

In one example, the panel is an OGS touch panel. As shown in FIG. 2, the plurality of transparent electrodes in the transparent electrode layer include a plurality of first electrode strips 100 and a plurality of second electrode strips 200. The first electrode strip 100 has an extending direction intersecting with that of the second electrode strip 200 and they are insulated from each other. Each of the first electrode strips 100 includes a plurality of first electrode blocks 110. As shown in FIG. 3, the panel further includes a first insulation layer 400 provided on the transparent electrode layer, a metal bridge layer provided on the first insulation layer 400 and a second insulation layer 500 on the metal bridge layer. A plurality of groups of via holes which extend through the first insulation layer 400 is provided within the first insulation layer 400. Each group of via holes includes a first via hole corresponding to the preceding first electrode block 110 and a second via hole corresponding to the following first electrode block 110. The metal bridge layer includes a plurality of metal bridges 300, the number of which is identical with that of groups of the via holes, and two ends of the metal bridge 300 electrically connect the two adjacent first electrode blocks 110 in the extending direction of the first electrode strip 100 by means of the first via hole and the second via hole.

As shown in FIG. 3, the first electrode block 110 of the first electrode strip 100 includes a transparent metal oxide layer 110a and a reduced metal layer 110b; and the second metal electrode strip 200 includes a transparent metal oxide layer 200a and a reduced metal layer 200b. In practice, the reduced metal layer 110b and the reduced metal layer 200b are located at the same layer. When the light rays illuminate at the reduced metal layer 110b and the reduced metal layer 200b, the diffusion reflection will occur, thereby achieving the anti-glare purpose.

In another embodiment of the present application, it provides a display apparatus including the panel provided by the present application.

The present panel can achieve the anti-glare function without using the anti-glare film, thereby reducing the cost of the display apparatus.

It should be understood that the above embodiments are only intended to interpret the principle of the present application and used as only the illustrative examples. However, the present application is not limited to this. As for those skilled in the art, various modifications and changes may be made to the present disclosure without departing from the principles and spirit of the present application. As such, these modifications and changes to the present application are also intended to be included within the scope of the present application.

What is claimed is:

1. A method for producing a panel, comprising the following steps of:
   providing a transparent substrate comprising an electrode setting area;
   forming a transparent electrode layer within the electrode setting are, wherein the transparent electrode layer comprises a plurality of transparent electrodes, and each of the transparent electrodes comprises a transparent metal oxide layer and a reduced metal layer located on the transparent metal oxide layer:
   wherein the step of forming the transparent electrode layer within the electrode setting area comprises:
   forming a transparent electrode material layer on the transparent substrate;
   reducing the transparent electrode material layer so that materials on a surface of the transparent electrode material layer are reduced;
   patterning the reduced transparent electrode material layer, so as to form the transparent electrode layer comprising the plurality of transparent electrodes,
   wherein the transparent metal oxide layer and the reduced metal layer form a gradual change from a transparent state to a semitransparent state.

2. The method as claimed in claim 1, wherein the step of reducing the transparent electrode material layer comprises:
   providing a reducing gas to the surface of the transparent electrode material layer, so that the materials on the surface of the transparent electrode material layer are reduced.

3. The method as claimed in claim 2, wherein the reducing gas comprises a hydrogen gas.

4. The method as claimed in claim 1, wherein the step of forming the transparent electrode layer within the electrode setting area comprises:
   forming the transparent electrode material layer on the transparent substrate;
   patterning the transparent electrode material layer, so as to form an initial transparent electrode layer comprising a plurality of initial transparent electrodes;
   reducing the initial transparent electrode layer, so that materials on a surface of the initial transparent electrode layer are reduced, thereby obtaining the transparent electrode layer.

5. The method as claimed in claim 4, wherein the step of reducing the initial transparent electrode layer comprises:
   providing a reducing gas to the surface of the initial transparent electrode layer, so that the materials on the surface of the initial transparent electrode layer are reduced.

6. The method as claimed in claim 5, wherein the reducing gas comprises a hydrogen gas.

7. The method as claimed in claim 1, wherein the material for producing the transparent metal oxide layer comprises indium tin oxide (ITO), and the reduced metal layer is transparent and the material for the reduced metal layer comprises indium.

8. The method as claimed in claim 1, wherein the panel is a touch panel and the transparent electrode layer is a touch electrode layer.

9. The method as claimed in claim 1, wherein the panel is a display panel and the transparent electrode layer is a pixel electrode layer or a common electrode layer.

10. The method as claimed in claim 1, wherein the transparent substrate comprises a light shielding zone disposed around the electrode setting area, and the method further comprises:
  forming a light shielding pattern within the light shielding zone.

11. A panel, comprising:
  a transparent substrate comprising an electrode setting area; and
  a transparent electrode layer provided in the electrode setting area and comprising a plurality of transparent electrodes, wherein each of the transparent electrodes comprises a transparent metal oxide layer and a reduced metal layer located on the transparent metal oxide layer:
  wherein the reduced metal layer is obtained by a metal oxide for forming the transparent metal oxide layer through a reduction reaction, and the reduced metal layer is a layer of metal powder, wherein the transparent metal oxide layer and the reduced metal layer form a gradual change from a transparent state to a semitransparent state.

12. The panel as claimed in claim 11, wherein the material for producing the transparent metal oxide layer comprises indium tin oxide (ITO), and the reduced metal layer is transparent and the material for the reduced metal layer comprises indium.

13. The panel as claimed in claim 12, wherein the panel is a touch panel and the transparent electrode layer is a touch electrode layer.

14. The panel as claimed in claim 13, wherein the transparent substrate comprises a light shielding zone disposed around the electrode setting area, and the panel further comprises a light shielding pattern provided within the light shielding zone.

15. The panel as claimed in claim 11, wherein the panel is a touch panel and the transparent electrode layer is a touch electrode layer.

16. The panel as claimed in claim 11, wherein the panel is a display panel and the transparent electrode layer is a pixel electrode layer or a common electrode layer.

17. The panel as claimed in claim 11, wherein the transparent substrate comprises a light shielding zone disposed around the electrode setting area, and the panel further comprises a light shielding pattern provided within the light shielding zone.

18. A display apparatus, comprising the panel as claimed in claim 11.

* * * * *